United States Patent
Higashida et al.

(10) Patent No.: US 7,620,364 B2
(45) Date of Patent: Nov. 17, 2009

(54) WIRELESS TRANSMISSION SYSTEM AND METHOD FOR WIRELESSLY TRANSMITTING DATA SIGNALS IN A FLIGHT VEHICLE

(75) Inventors: Masaaki Higashida, Osaka (JP); Yasuaki Sakanishi, Osaka (JP); Toshihiro Ezaki, Osaka (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 11/389,236

(22) Filed: Mar. 27, 2006

(65) Prior Publication Data

US 2007/0213009 A1    Sep. 13, 2007

(30) Foreign Application Priority Data

Mar. 13, 2006    (JP)    ............................ 2006-067414

(51) Int. Cl.
  H04B 7/15    (2006.01)
  H04B 15/00   (2006.01)
  H04B 17/00   (2006.01)
  H04B 7/00    (2006.01)
  H04B 1/40    (2006.01)
  H04B 1/034   (2006.01)
  H04W 4/00    (2009.01)

(52) U.S. Cl. .................. 455/11.1; 455/62; 455/66.1; 455/76; 455/98; 455/431

(58) Field of Classification Search ............... 455/11.1, 455/76, 98, 431, 62, 66.1; 342/172
See application file for complete search history.

(56) References Cited

U.S. PATENT DOCUMENTS

| | | | | |
|---|---|---|---|---|
| 2,579,591 A | * | 12/1951 | Ley et al. | ............ 455/11.1 |
| 4,404,685 A | * | 9/1983 | Rogers | ............ 455/76 |
| 4,679,049 A | * | 7/1987 | Riffiod | ............ 342/172 |
| 6,167,239 A | * | 12/2000 | Wright et al. | ............ 455/66.1 |
| 6,768,906 B2 | * | 7/2004 | Matthews et al. | ............ 455/431 |
| RE40,479 E | * | 9/2008 | Wright et al. | ............ 455/98 |
| 2002/0049055 A1 | * | 4/2002 | Matthews et al. | ............ 455/431 |
| 2003/0008651 A1 | * | 1/2003 | Trachtman et al. | ............ 455/431 |
| 2004/0098745 A1 | | 5/2004 | Marston et al. | |
| 2004/0242149 A1 | | 12/2004 | Luneau | |
| 2007/0213009 A1 | * | 9/2007 | Higashida et al. | ............ 455/62 |

FOREIGN PATENT DOCUMENTS

| | | |
|---|---|---|
| EP | 1 326 352 | 7/2003 |
| JP | 2-39736 | 2/1990 |
| JP | 2-39739 | 2/1990 |
| WO | 01/15339 | 3/2001 |

* cited by examiner

Primary Examiner—William D Cumming
(74) Attorney, Agent, or Firm—Wenderoth, Lind & Ponack, L.L.P.

(57) ABSTRACT

Changing the seating configuration when there are wired connections to each seat is difficult. A wireless transmission system and method communicate wirelessly while also preventing interference with the ground communication system. The wireless transmission system wirelessly transmits data signals inside the aircraft, and has an altitude zone identification arrangement for determining in which of N altitude zones the aircraft is flying, access points that can transmit the data signals wirelessly on any one frequency band selected from among M frequency bands, client units for receiving the data signals, and a selection unit for selecting one of the M frequency bands based on the altitude zone in which the aircraft is flying. The altitude zone identification arrangement includes an aircraft altitude detection unit and system control unit, and the selection unit includes the system control unit.

16 Claims, 13 Drawing Sheets

Fig.4

| FREQUENCY BAND | CENTER FREQUENCY (GHz) | WIRELESS CHANNEL NAME |
|---|---|---|
| F1 | 5.18 | C36 |
|  | 5.20 | C40 |
|  | 5.22 | C44 |
|  | 5.24 | C48 |
| F2 | 5.26 | C52 |
|  | 5.28 | C56 |
|  | 5.30 | C60 |
|  | 5.32 | C64 |

| FREQUENCY BAND | CENTER FREQUENCY (GHz) | WIRELESS CHANNEL NAME |
|---|---|---|
| F3 | 5.50 | C100 |
|  | 5.52 | C104 |
|  | 5.54 | C108 |
|  | 5.56 | C112 |
|  | 5.58 | C116 |
|  | 5.60 | C120 |
|  | 5.62 | C124 |
|  | 5.64 | C128 |
|  | 5.66 | C132 |
|  | 5.68 | C136 |
|  | 5.70 | C140 |
| F4 | 5.745 | C149 |
|  | 5.765 | C153 |
|  | 5.785 | C157 |
|  | 5.805 | C161 |

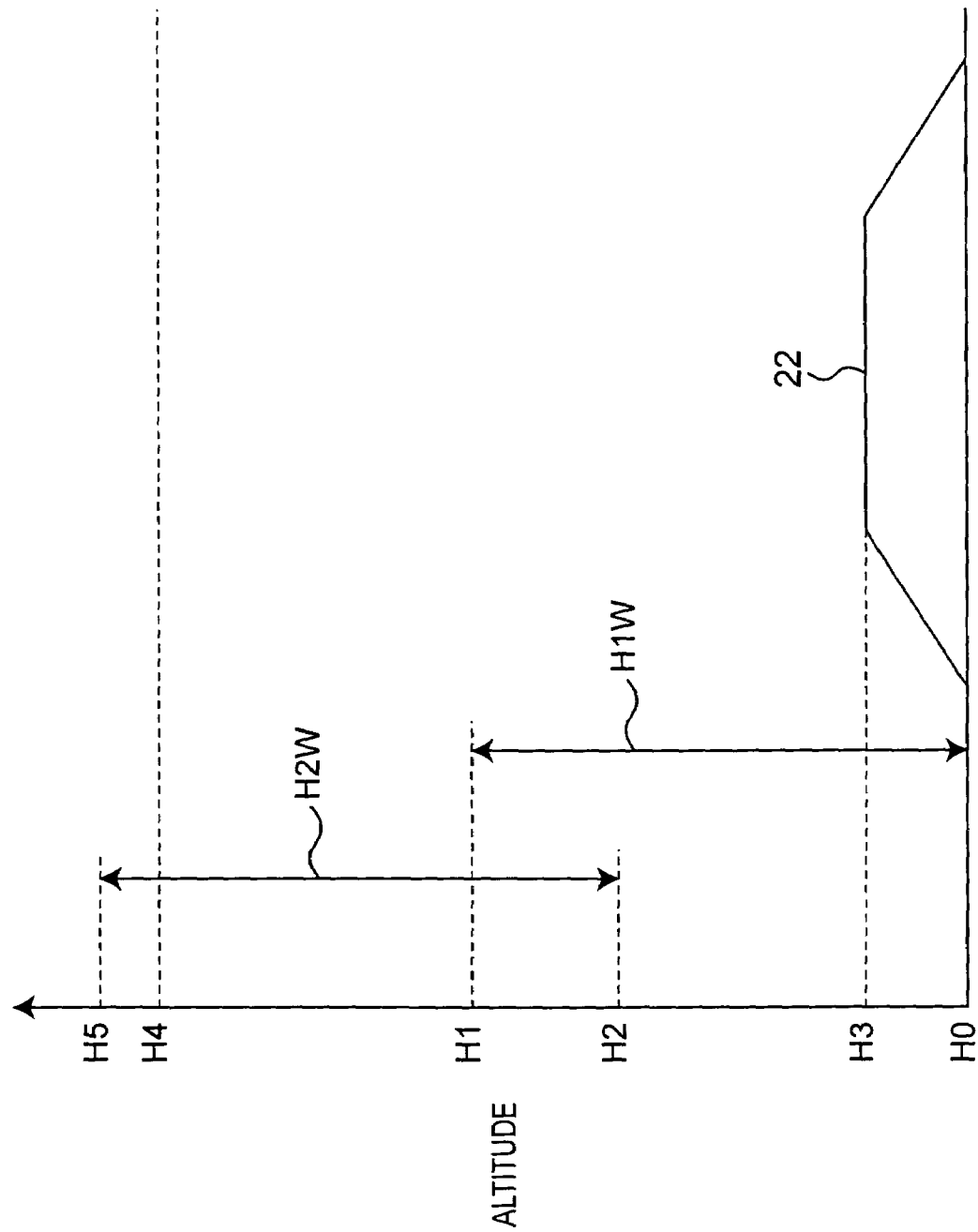

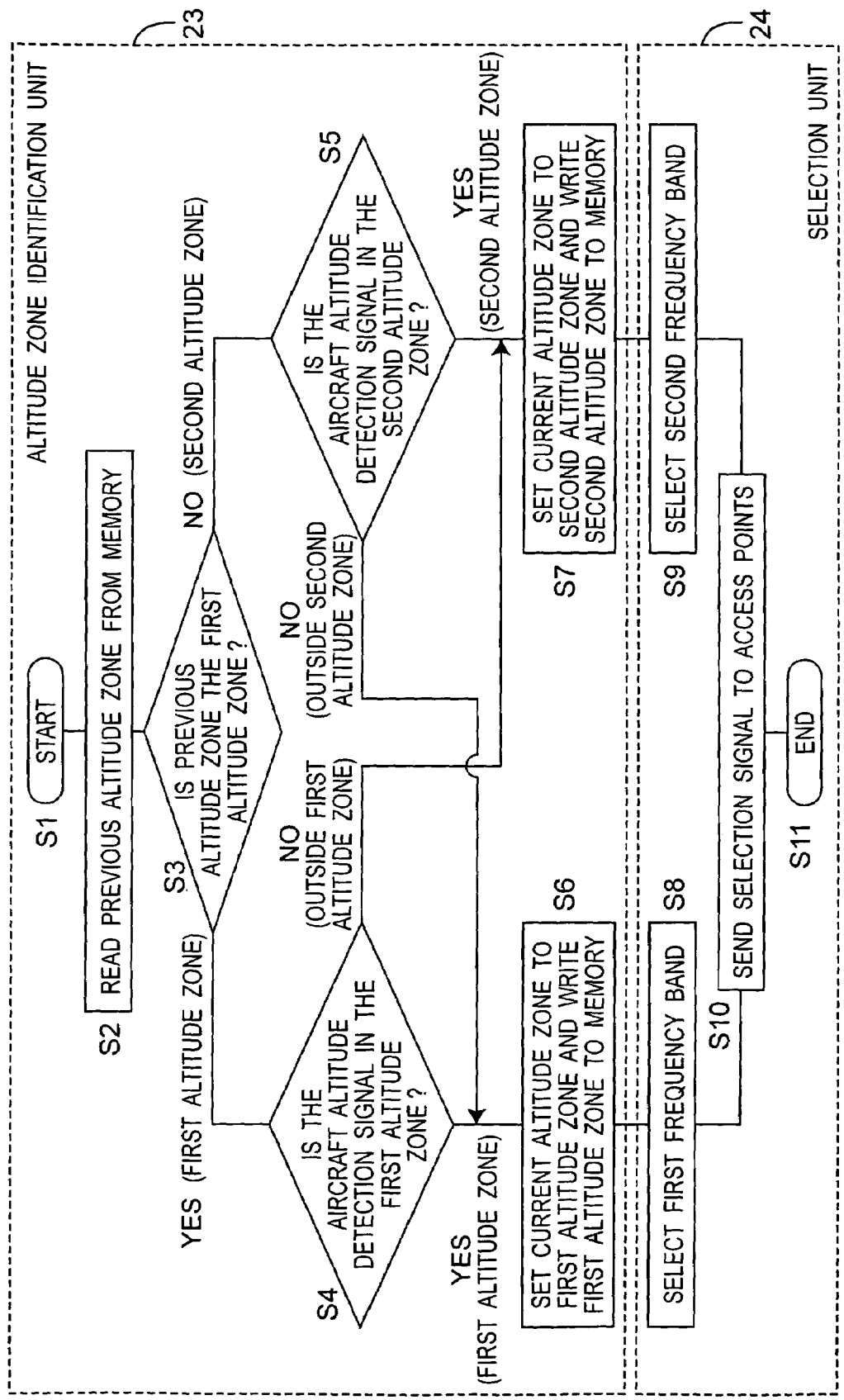

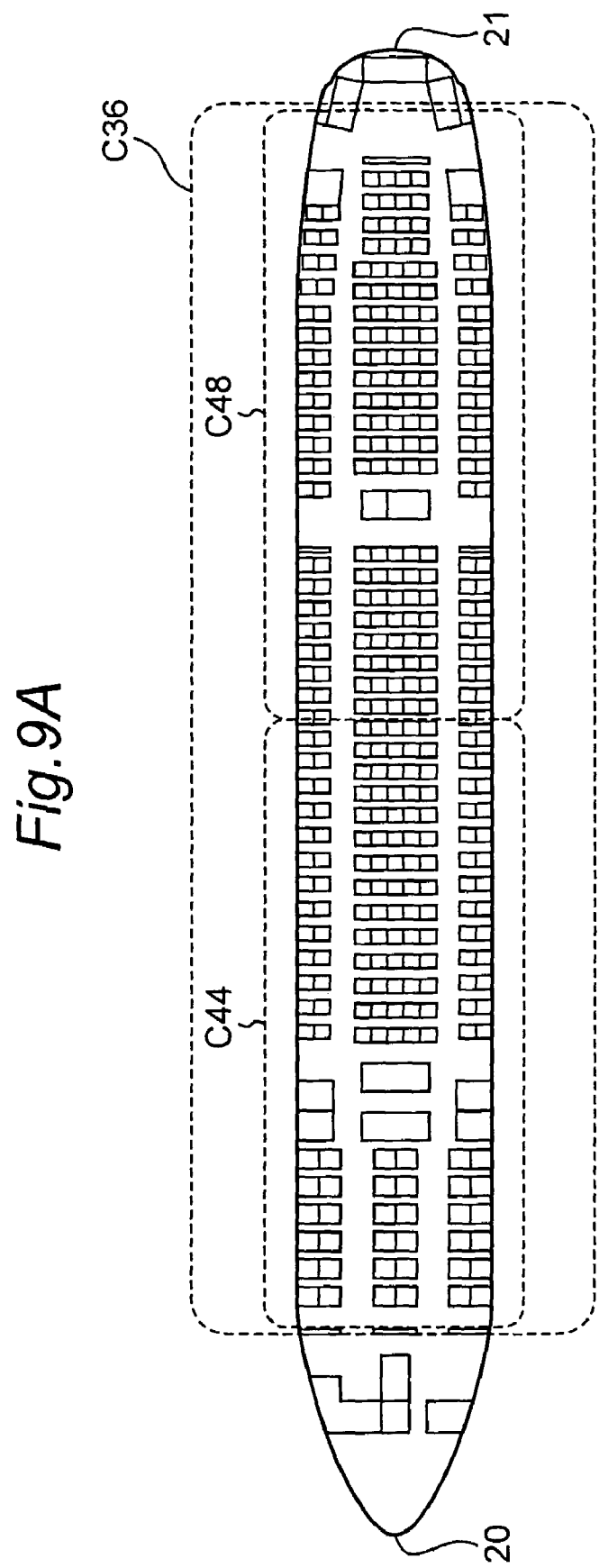

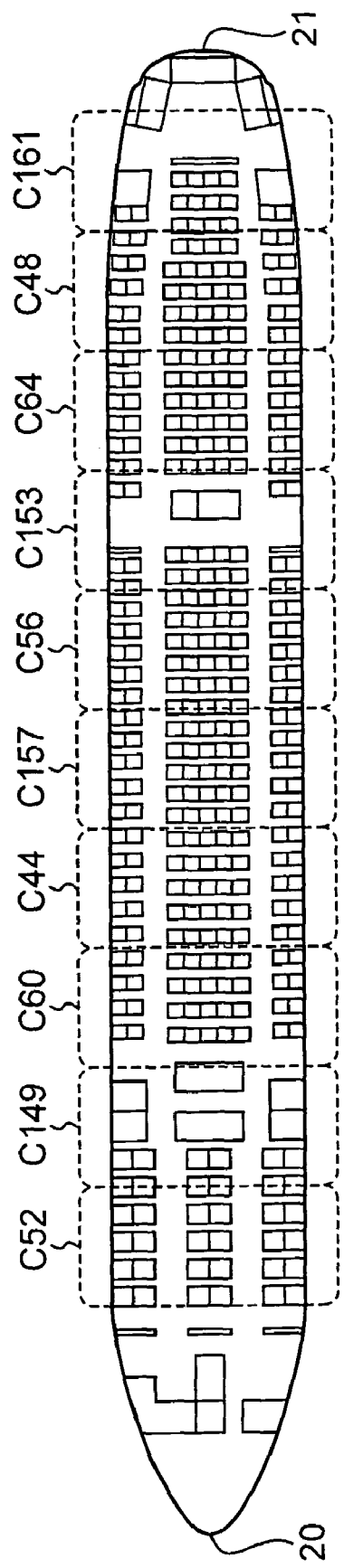

WIRELESS TRANSMISSION SYSTEM AND METHOD FOR WIRELESSLY TRANSMITTING DATA SIGNALS IN A FLIGHT VEHICLE

BACKGROUND OF THE INVENTION

1. Field of Technology

The present invention relates to wireless transmission technology for effectively utilizing frequency bands to maximize transmission capacity in airplanes and other types of aircraft.

2. Description of Related Art

In-flight entertainment ("IFE") systems used in passenger planes in recent years have helped make long-distance flights more enjoyable by providing passengers with in-flight entertainment services such as movies, audio programming, games, and even Internet browsing. The movies, audio programming, Internet data, and other information accessible by these systems are typically stored in an on-board server, and delivered from the server by coaxial cable, optical fiber, or other wired medium as either analog or digital transmissions. IFE equipment generally includes a ceiling-mounted projector and an LCD or other type of video monitor, as well as compact, individual monitors and controllers (handsets) installed at individual passenger seats.

The main transmission cable from the server is generally located in the ceiling, and other ceiling-mounted devices are connected by trunk lines from the main cable. In order to connect to devices located in the floor-mounted seats, large numbers of relay cables are wired through the side walls of the aircraft. Because maximizing the operating time of high cost airplanes is a major concern for airline companies, airlines frequently change the routes on which aircraft are used and the ticket class configuration of the planes. This necessitates changing the seat positions, which is preferably done in a short time and at low cost. However, because changing the seating configuration also means that the relay lines in the side walls must also be changed, changing the seating arrangement takes a long time and is thus expensive. There is, therefore, a need to change from a wired to a wireless transmission medium.

For years some aircraft have also been equipped with an aircraft telecommunications system enabling telephone communication with ground stations. To prevent RF interference with the ground telephone system, these on-board telecommunication systems are assigned a dedicated wireless frequency band that is reserved for in-flight telephone systems. Dedicating a wireless frequency band to such in-flight telephone systems, which have few subscribers and carry few calls, is an inefficient use of bandwidth, however, and technologies enabling sharing bandwidth with the ground telephone system without adversely affecting the existing phone system have been proposed.

When a mobile station installed in an aircraft selects a wireless frequency for communication but the selected wireless frequency is already being used for telecommunication with another mobile station and this communication is subject to noise caused by RF interference from the mobile station on the aircraft, reference patent 1 below teaches a method of unconditionally switching the wireless telephone frequency that is already in use to another RF frequency, and preventing that frequency from being used for telecommunication on the ground system if the selected RF communication frequency is not already being used. This technology enables economically deploying mobile communication systems enabling in-flight telephone services without setting aside new wireless frequencies reserved for in-flight telephone service and without requiring the installation of new dedicated equipment.

Reference patent 2 below teaches technology for controlling the transmission power of mobile in-flight telecommunication equipment to prevent RF interference interrupting car phone systems operating on the terrestrial telephone system, and controlling the reception power in order to prevent communication interference caused by RF interference from terrestrial car phone communications. This technology enables economically deploying mobile communication systems enabling in-flight telephone services without setting aside new wireless frequencies reserved for in-flight telephone service and without requiring the installation of new dedicated equipment.

Reference patent 1: Japanese Unexamined Patent Appl. Pub. H02-39736

Reference patent 2: Japanese Unexamined Patent Appl. Pub. H02-39739

Transmitting primarily video information to individual seats inside an aircraft requires significant bandwidth. If a broadcast system that transmits the same content simultaneously to each seat is used and the video signal is sent to each seat at a 5 megabit/second bit rate, the transmission path only requires the same 5 Mb/sec transmission capacity. However, if an on-demand unicast system enabling each user to receive content as desired is used, a transmission path with a capacity exceeding 1 Gb/second must be provided for each of several hundred seats. While the transmission load on the relay lines is not as great as the main trunk line, each relay line supplies anywhere from several to several ten seats and a transmission capacity of from several ten to several 100 megabits/second is therefore required.

Converting this wired system to a wireless system requires building a system that can assure a transmission capacity between several ten to several 100 megabits/second without adversely affecting the terrestrial wireless phone system. With the technologies taught in reference patents 1 and 2, however, the wireless telephone transmission capacity is less than or equal to 1 megabit/second, and the large transmission capacity noted above cannot be assured.

SUMMARY OF THE INVENTION

The present invention is directed to solving this problem, and an object of the invention is to build a system that can assure transmission capacity sufficient to carry large amounts of video data without adversely affecting or being affected by the terrestrial wireless telephone network.

To achieve this object, a wireless transmission system according to the present invention is a system for wirelessly transmitting data signals in an aircraft, and comprises a wireless transmission arrangement operable to wirelessly transmit the data signals on any one frequency band selected from among M (where M is an integer of 2 or more) frequency bands; a wireless reception arrangement operable to receive the data signals; and a selection arrangement operable to select one frequency band from the M frequency bands.

A wireless transmission method according to another aspect of the invention is a method for wirelessly transmitting data signals in an aircraft, and comprises a step of wirelessly transmitting the data signals on any one frequency band selected from among M (where M is an integer of 2 or more) frequency bands; a step of receiving the data signals; and a step of selecting one frequency band from the M frequency bands.

The wireless transmission system and method of the present invention wirelessly transmit data signals to each seat. As a result, changing the wiring is not needed when changing the seating configuration, the seating configuration can thus be changed in a short time, the in-service rate of the aircraft can be improved, and the cost of changing the seating configuration can be reduced. Furthermore, because the wireless frequency band is changed based on the altitude zone where the aircraft is flying, a frequency band that is limited to prevent mutual interference with ground communication systems can be used when flying at low altitude to provide the minimum required services. Furthermore, because there is no interference with the ground communication system or interference from the ground communication system when flying at high altitude, a wide frequency band can be used to provide more advanced services such as video-on-demand. As a result, the need for advanced in-flight services can be met while also reducing wireless interference with the ground communication system.

BRIEF DESCRIPTION OF THE DRAWINGS

FIG. 4 describes the center frequency of wireless channels and the wireless channel call letters.

FIG. 7 describes the relationship between altitude ranges.

FIG. 8 is a flow chart describing the altitude identification unit and selection unit in the system control unit.

FIG. 9A describes wireless channel coverage in a third embodiment of the invention when the aircraft is at low altitude.

FIG. 9B describes wireless channel coverage in a third embodiment of the invention when the aircraft is at high altitude.

DETAILED DESCRIPTION OF THE PREFERRED EMBODIMENTS

Figure 1:
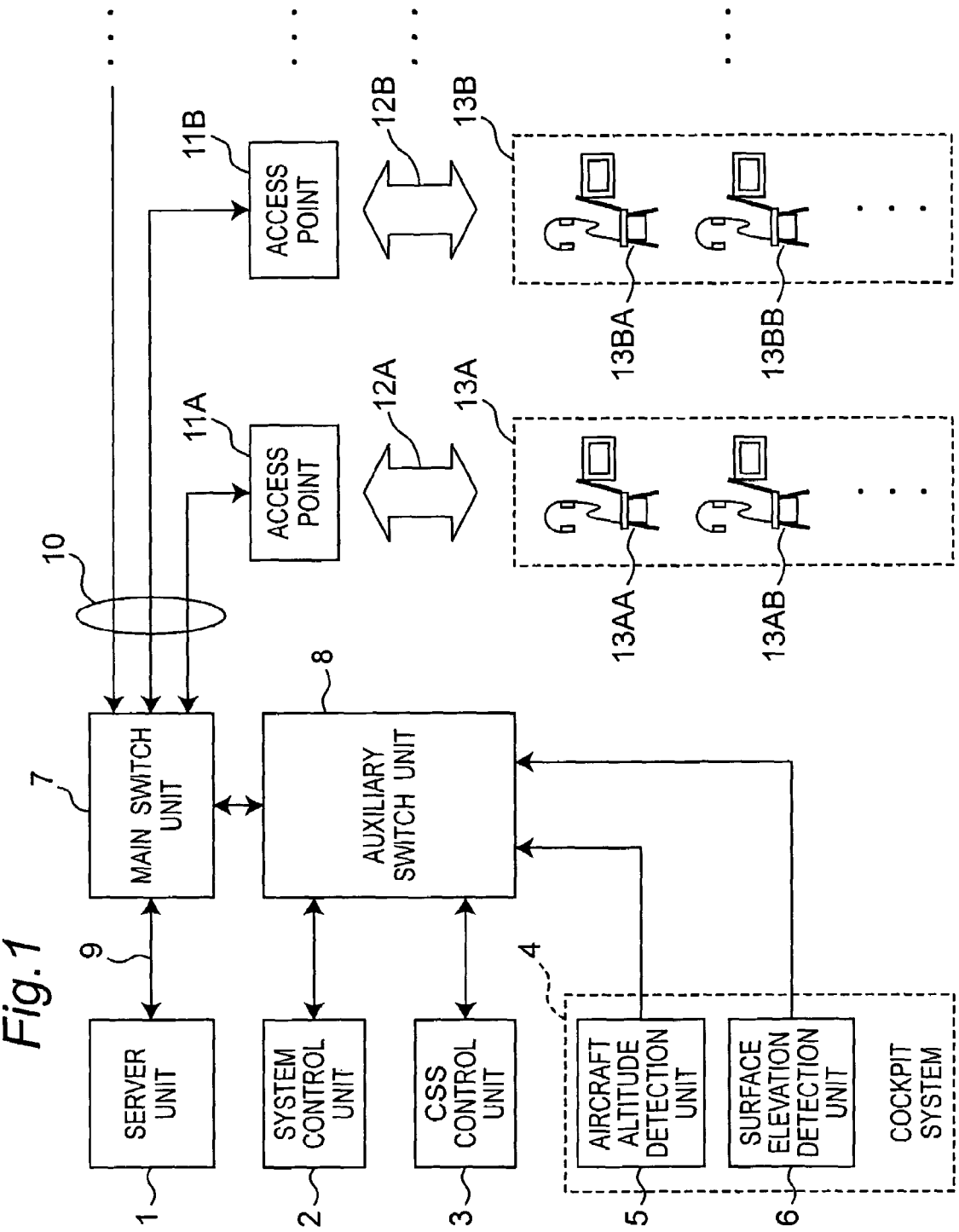
FIG. 1 is a block diagram showing the general arrangement of the first embodiment of the invention.

Preferred embodiments of the present invention are described below with reference to the accompanying figures. Elements having effectively the same arrangement, operation, and effect are identified by the same reference numerals in the figures. In addition, numeric values cited in the following description are used to describe the invention specifically by way of example, and the invention is not limited to these values.

First Embodiment

FIG. 1 is a block diagram showing the general arrangement of the first embodiment of the invention. This first embodiment of the invention is installed inside an aircraft. The aircraft may be an airplane with jet engines or propellers, for example, a helicopter, a hovercraft, a balloon tethered to the ground, a rocket, a man-made satellite, a space station, or any other type of craft that can remain aloft at a predetermined distance or more from the Earth's surface for at least a predetermined period of time. This first embodiment of the invention is described using a passenger plane by way of example only. There may be several hundred passenger seats installed in the airplane, and passengers can enjoy movies, audio programming, games, and Internet browsing by an in-flight entertainment (IFE) system.

Referring to FIG. 1, the server unit 1 includes a hard disk array for storing data signals including at least one of a video signal or an audio signal, and an AV server for reading and outputting data signals from the hard disk array in real-time. The AV server is also called a video server, and includes a computer server and other hardware for improving server performance as may be needed. The server unit 1 is thus built to function as a high-throughput server capable of meeting demand for VOD (video-on-demand) service from several hundred people.

The server unit 1 also has the functions of a web server and telephone exchange, and thus enables Internet browsing and telecommunication services by making a connection via an antenna to communication satellites or ground-based telecommunication equipment. The server unit 1 thus stores one or more types of data signals including video signals, audio signals, and Internet data signals.

The data signals output from the server unit 1 are distributed by way of connection 9, main switch unit 7, and trunk 10 to each of a predetermined number, such as ten or more, of access points 11A, 11B in the airplane. The access points 11A, 11B are collectively referred to below as access point 11. The connection 9 is a Gigabit Ethernet path so that it can carry massive numbers of data signals. Gigabit Ethernet can be provided using 1000Base-T shielded twisted-pair cable or optical fiber cable for greater resistance to electromagnetic interference over long distances, and the specific type of connection will be determined based on the size of the aircraft, cost, and ease of installation and maintenance.

The main switch unit 7 includes a Layer 3 compatible Gigabit Ethernet switch, and has enough ports and throughput to enable transmitting the data signals to the access points 11 without convergence. For example, because all of the data signals flowing to the ten or more trunks 10 flow through connection 9, the main switch unit 7 is configured so that the input capacity of the main switch unit 7 ports connected to connection 9 is sufficiently high compared with the input/output capacity of the other ports.

An auxiliary switch unit 8 for switching the flow of primarily various control signals is connected to the main switch unit 7. The auxiliary switch unit 8 can be a Gigabit Ethernet switch similarly to the main switch unit 7, but a 100-megabit Ethernet switch is normally sufficient.

The system control unit 2 is connected to the auxiliary switch unit 8. The system control unit 2 comprises one or more computers and in this first embodiment of the invention controls the entire in-flight entertainment system.

The CSS control unit 3 is also connected to the auxiliary switch unit 8 and controls the cabin service system (CSS). The cabin service system enables each passenger to turn the reading light on and off or call the flight attendant to one's seat for service. These services can be rendered as functions of the cabin service system itself or as a part of the functions of the in-flight entertainment system.

The cockpit system 4 is also connected to the auxiliary switch unit 8. The cockpit system 4 is the system for controlling flying the aircraft, and thus plays an extremely important role in aircraft operation. The amount of data that can be sent from the auxiliary switch unit 8 to the cockpit system 4 is particularly limited, and the auxiliary switch unit 8 is isolated by a firewall to protect the security of the cockpit system 4. The cockpit system 4 includes a variety of instruments for measuring and monitoring various internal and external conditions that are essential to flying the aircraft.

The aircraft altitude detection unit 5 generates and outputs to the auxiliary switch unit 8 an aircraft altitude detection signal indicating the altitude of the aircraft measured from sea level. The aircraft altitude detection unit 5 comprises at least one of the following: an altimeter, a GPS receiver, a barometer, an airspeed gauge, and a wireless carrier sensor. The aircraft altitude detection unit 5 may also use a position identification system for independently determining the position of the aircraft.

The surface elevation detection unit 6 generates and outputs to the auxiliary switch unit 8 a surface elevation detection signal denoting the altitude of the Earth's surface at the current flight position of the aircraft. The surface elevation detection unit 6 also comprises at least one of the following: an altimeter, a GPS receiver; a barometer, an airspeed gauge, and radar.

The aircraft altitude detection unit 5 and surface elevation detection unit 6 can also be rendered as a single device sharing at least part of their components, such as the sensor unit, to generate both the aircraft altitude detection signal and surface elevation detection signal.

The aircraft altitude detection signal indicates the altitude of the aircraft measured from sea level, and the surface elevation detection signal indicates the altitude of the Earth's surface at the current flight position of the aircraft measured from sea level. The height of the aircraft from the Earth's surface is therefore the difference of the altitude denoted by the aircraft altitude detection signal minus the altitude denoted by the surface elevation detection signal. Both the aircraft altitude detection signal and surface elevation detection signal are sent through the auxiliary switch unit 8 to the system control unit 2.

Note that the arrangement comprising a system control unit 2, CSS control unit 3, aircraft altitude detection unit 5, surface elevation detection unit 6, and auxiliary switch unit 8 as shown in FIG. 1 is by way of example only, and the present invention is not limited to this arrangement. For example, this first embodiment of the invention can be arranged with the CSS control unit 3, aircraft altitude detection unit 5, and surface elevation detection unit 6 connected directly to the system control unit 2, or the auxiliary switch unit 8 integrated with the main switch unit 7 with the port functions of the auxiliary switch unit 8 handled by some of the ports in the main switch unit 7, or by using a computer with multiple ports instead of the auxiliary switch unit 8.

Data signals distributed to the access point 11 are converted to wireless signals and transmitted to each client unit 13AA, 13AB in wireless zone 13A. This wireless zone 13A represents the area in which the wireless signals can be reliably communicated through access point 11A. One wireless channel is allocated to each wireless zone. There is typically one client unit 13AA, 13AB located at each seat in the aircraft. Wireless communication between access point 11A and each client unit 13AA, 13AB flows in both directions, up and down. Transmission from access point 11A to client units 13AA, 13AB is down, and transmission from the client units 13AA, 13AB to access point 11A is up. Access point 11A transmits wireless signals during down transmissions, and receives the wireless signals during up transmissions. Because the access point 11A transmits wirelessly, the access point 11A is also referred to as a wireless transmitter. Access point 11B and the other access points, wireless zone 13B and the other wireless zones, and client units 13BA, 13BB and other client units operate in the same way as described above, and further description thereof is omitted here.

Figure 2:
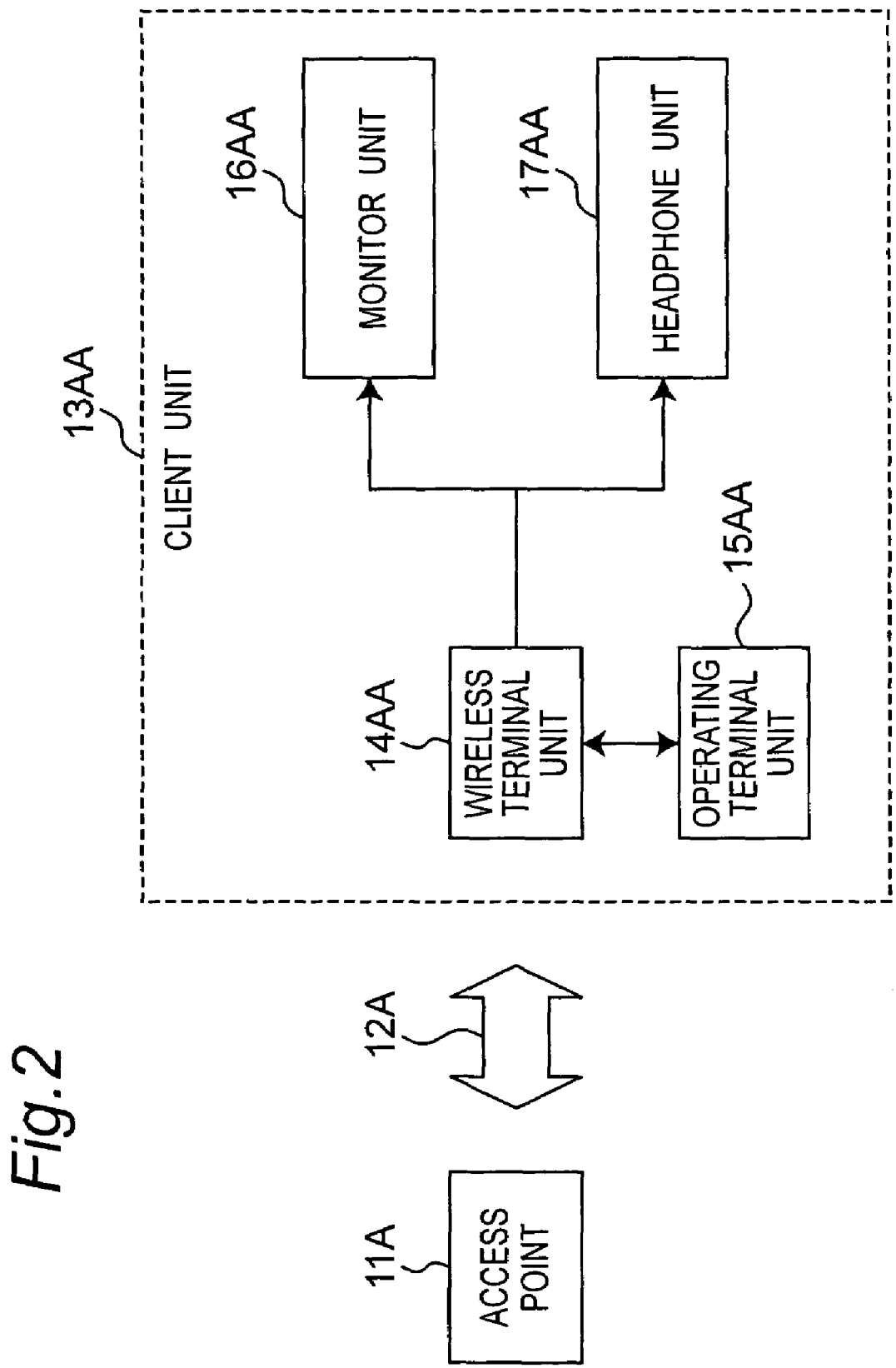
FIG. 2 is a detailed block diagram showing the arrangement of a client unit in the first embodiment of the invention.

FIG. 2 is a detailed block diagram showing the arrangement of a client unit 13AA in the first embodiment of the invention. The wireless data signal 12A from access point 11A is input to wireless terminal unit 14AA. The wireless terminal unit 14AA includes a communication antenna and wireless encoder/decoder. The communication antenna receives the wireless data signal 12A and transmits various control signals from the client unit 13AA. The wireless encoder/decoder decodes the wireless data signal 12A from the communication antenna to the data signal, sends the video signal portion of the data signal to the monitor unit 16AA, and sends the audio signal portion of the data signal to the headphone unit 17AA.

The wireless terminal unit 14AA also converts control signals from the operating terminal unit 15AA to wireless signals to transmission to the access point 11A. The wireless terminal unit 14AA receives wirelessly, and is therefore also called a wireless receiver.

The operating terminal unit 15AA comprises switches for the cabin service system, including the reading light switch and flight attendant call switch, and thus sends CSS control signals to the CSS control unit 3 by way of wireless terminal unit 14AA, access point 11A, trunk 10, main switch unit 7, and auxiliary switch unit 8. The operating terminal unit 15AA is also called a handset or controller.

The CSS control unit 3 operates the cabin service system based on the CSS control signals. The operating terminal unit 15AA also has an image quality adjustment switch for the monitor unit 16AA, and sends video adjustment control signals through the wireless terminal unit 14AA to the monitor unit 16AA. Based on the video adjustment control signal, the monitor unit 16AA can adjust the image quality of the monitor unit 16AA.

The operating terminal unit 15AA also has a data signal channel selection switch and VOD service switch, and can thus send a data control signal to the system control unit 2 by way of wireless terminal unit 14AA, access point 11A, trunk 10, main switch unit 7, and auxiliary switch unit 8.

The system control unit 2 adjusts the convergence of the VOD service system based on the data control signals received from all seats in the aircraft, and outputs distribution commands to the server unit 1 by way of main switch unit 7 and auxiliary switch unit 8 for the data signals to be output to the client unit 13AA.

The server unit 1 then attaches the address of the client unit 13AA to the data signal, and outputs the addressed data signal.

If the operating terminal unit 15AA also has a keyboard and mouse, for example, the operating terminal unit 15AA can also send computer control signals to the server unit 1 by way of the wireless terminal unit 14AA, access point 11A, trunk 10, and main switch unit 7. Based on the computer control signals, the server unit 1 enables an Internet browsing service for the client unit 13AA.

While the operation of client unit 13AA is described above, the other client units 13AB, 13BA, 13BB are also arranged as shown in FIG. 2, operate in the same way as client unit 13AA, and further description thereof is thus omitted.

Furthermore, the system control unit 2 controls the VOD service system in this first embodiment of the invention, but the server unit 1 could control the VOD service system if the operating terminal unit 15AA sends the data control signals to the server unit 1.

Figure 3:
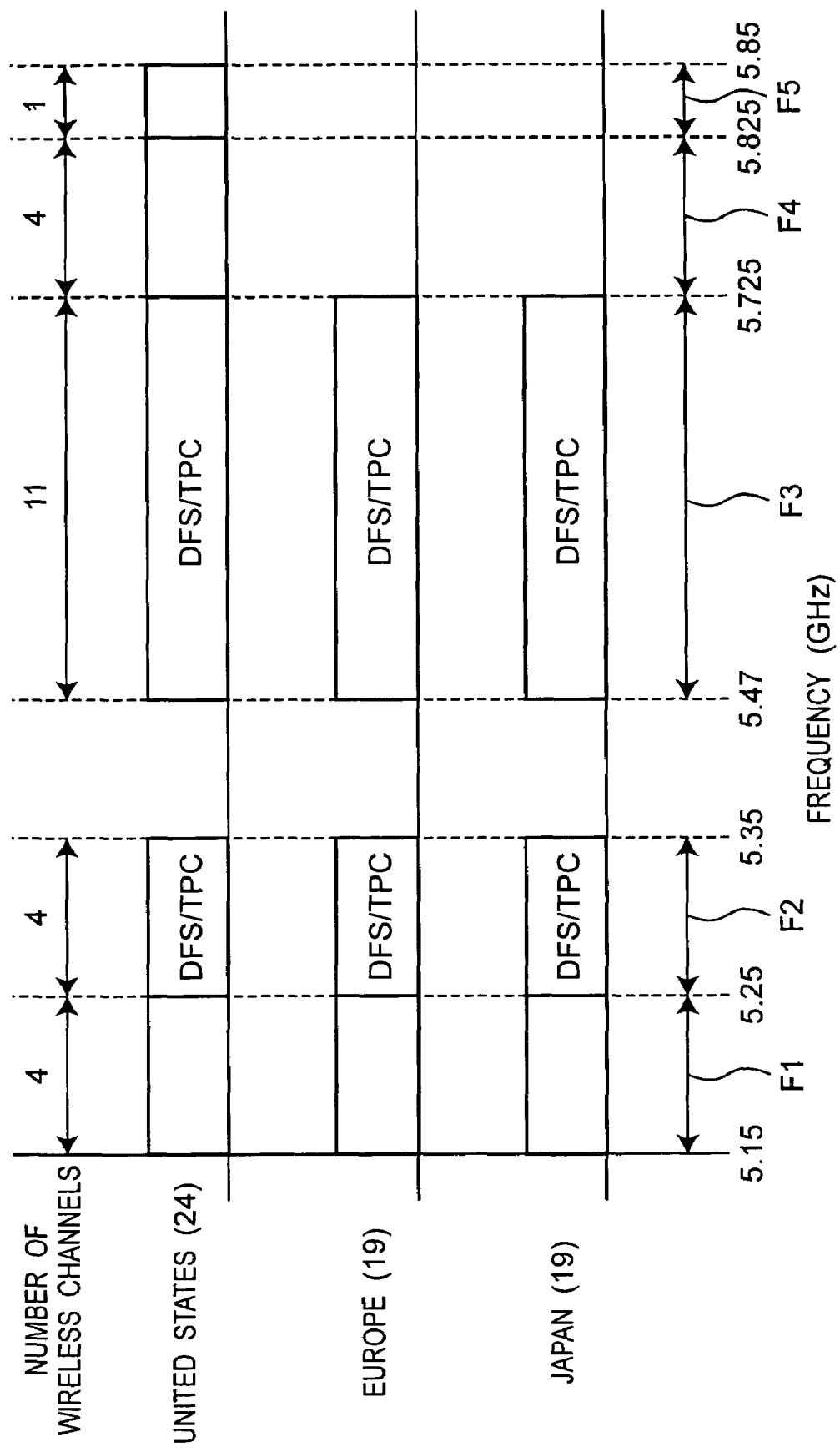
FIG. 3 describes bandwidth allocation of the 5-GHz band in the United States, Europe, and Japan.

The wireless communication system operating in the 5-GHz band and known as IEEE 802.11a is used for wireless access control in this first embodiment of the invention. FIG. 3 describes how the 5-GHz band is used in the United States, Europe, and Japan. A 5-GHz band wireless access system allocates 18 MHz to each wireless channel. In the F1 frequency band from 5.15 GHz to 5.25 GHz, four wireless channels are reserved as frequency bands for the wireless access system in each of these three regions. In the F2 frequency band from 5.25 GHz to 5.35 GHz, four wireless channels are reserved as frequency bands for the wireless access system in each of these three regions, but it is also necessary to provide for dynamic frequency selection (DFS) and transmission power control (TPC) in the F2 band. DFS enables detecting radar interference and changing the wireless channel, while TPC provides for adjusting and reducing system power consumption. The F2 band is also used by weather radar and earth exploration satellites, and DFS and TPC are used together to prevent interference with these systems. While DFS and TPC are able to reduce interference, the effective transmission capacity also drops somewhat when DFS and TPC are operating.

Eleven wireless channels are rendered in the F3 frequency band from 5.47 GHz to 5.725 GHz. As in the F2 band, DFS and TPC must also be provided in the F3 band. The F3 band is also used for marine radar and military radar, and DFS and TPC are provided to prevent interference with these other systems.

Four wireless channels are also allocated in the F4 frequency band from 5.725 GHz to 5.825 GHz, and one wireless channel is reserved in the F5 frequency band from 5.825 GHz to 5.85 GHz, in the United States. There is thus a total of 24 wireless channels in the United States, and 19 wireless channels in Europe and Japan. This allocation of wireless channels is current as of this writing, and is obviously subject to change in the future.

FIG. 4 shows the center frequency of the 18-MHz frequency band allocated to each wireless and the wireless channel name for each of the frequency bands F1, F2, F3, and F4 used in the United States. In this first embodiment of the invention the F1 frequency band is called the first frequency band, and the frequency band covering frequency bands F1, F2, F3, and F4 is called the second frequency band. The first frequency band and second frequency band are not limited to these frequency bands, and be set as desired. In this case the first frequency band and second frequency band can overlap in part as described above, or there could be no overlap between the bands.

Figure 5A:
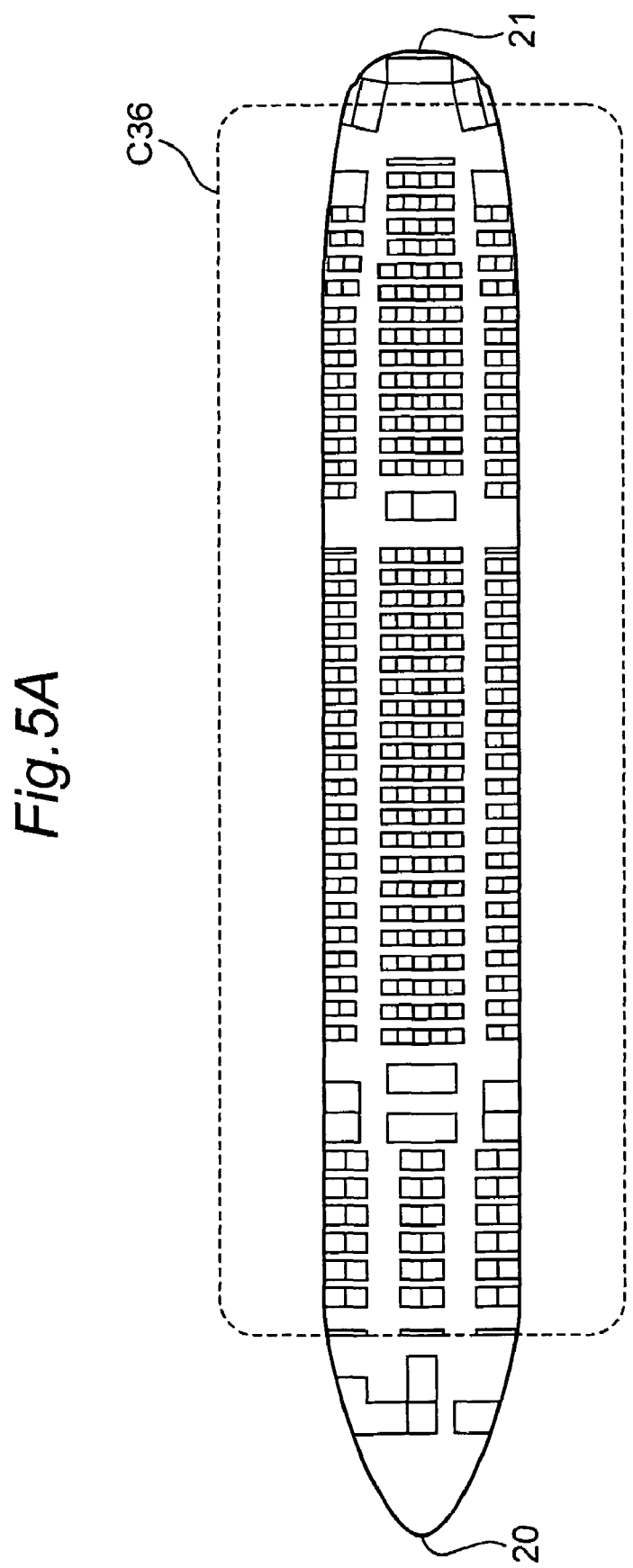
FIG. 5A describes wireless channel coverage in the first embodiment of the invention when the aircraft is at low altitude.
Figure 5B:
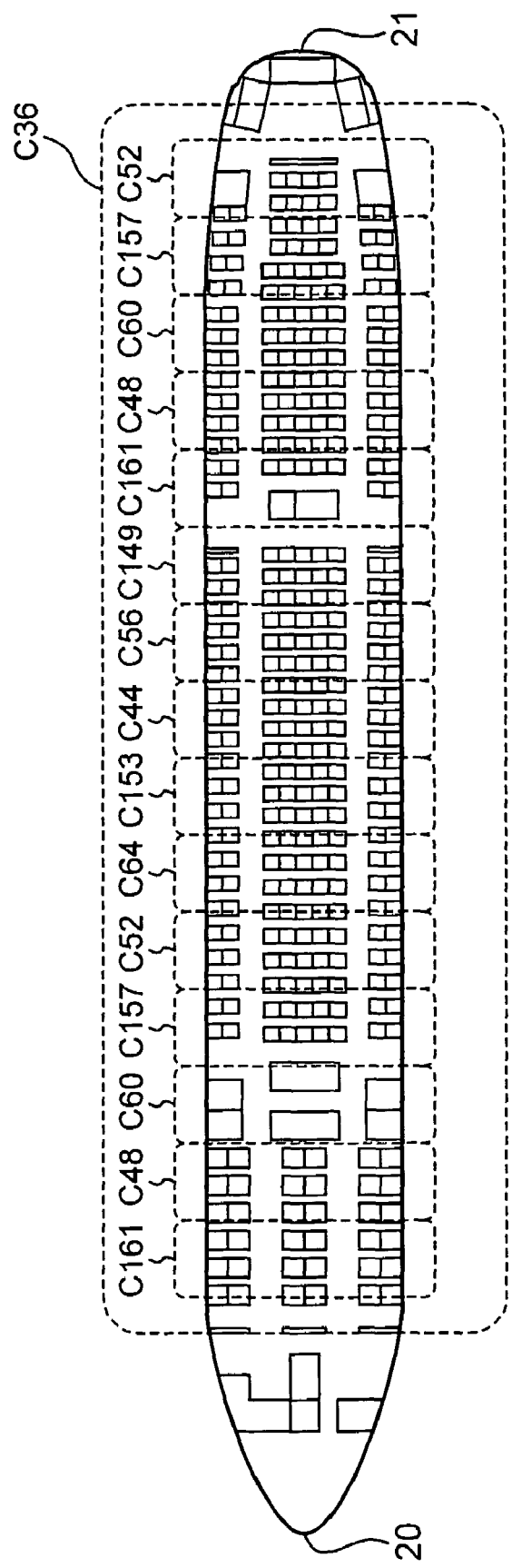
FIG. 5B describes wireless channel coverage in a first embodiment of the invention when the aircraft is at high altitude.

FIG. 5A and FIG. 5B describe the allocation of the wireless channels shown in FIG. 4 to the different parts of the aircraft. Both FIG. 5A and FIG. 5B are horizontal section views through the fuselage of the airplane, and are top plan views showing the seating arrangement with the top of the fuselage removed. One wireless channel is allocated to each wireless zone denoted by a dotted line in the figures, and all wireless zones are located between the front 20 and the rear 21 of the aircraft. The directivity of the antenna in each access point is high, and each wireless zone is formed so that the overlap between wireless zones is small, the gap between wireless zones is small, and wireless power within each wireless zone is as uniform as possible.

FIG. 7 describes different altitude ranges of the aircraft. The aircraft takes off from an airport 22 located at a surface altitude H3 referenced to sea level altitude H0, climbs to cruising altitude H4, and then flies at cruising altitude H4 to the destination at a predetermined cruising speed.

An aircraft flying to airport 22 descends from cruising altitude H4 on the approach, and lands at airport 22 located at surface altitude H3. The altitude of the aircraft is divided into a plurality of altitude zones. FIG. 7 shows the airspace divided into first altitude zone H1W and second altitude zone H2W, but there could be three or more altitude zones.

The first altitude zone H1W ranges from sea level altitude H0 to aircraft altitude H1, and the second altitude zone H2W is set from aircraft altitude H2 to aircraft altitude H5. The average altitude of first altitude zone H1W is lower than the average altitude of second altitude zone H2W. Aircraft altitude H5 is higher than cruising altitude H4, and is also sufficiently higher than the maximum cruising altitude at which the aircraft can fly. When the aircraft is parked at the airport 22, the aircraft is in first altitude zone H1W.

The wireless zone allocation shown in FIG. 5A corresponds to when the aircraft is in first altitude zone H1W, and the wireless zone allocation shown in FIG. 5B corresponds to when the aircraft is in second altitude zone H2W.

In-flight services are described next. Some services must be available at all times in the aircraft. These services include, for example, crew announcements, audio and other communications between crew members, instructions about using life preservers, and CSS services such as reading light control and flight attendant call services. Some airlines also provide live transmission of video from cameras outside the aircraft as an added service when flying at low altitude. These essential in-cabin services and some added services provided when flying at low altitude are referred to below as "first services." These first services together with in-flight entertainment system services such as video-on-demand requiring a large transmission capacity are referred to as "second services."

In order to provide such first services and second services inside an aircraft, it is important that wireless signals from the wireless access system not interfere with weather radar and earth exploration satellite operation, and that there is no interference between the wireless zones of the wireless access system. Unlike wireless access systems on the ground that assume the presence of any number of wireless transmission sources, the in-flight wireless access system controls the wireless transmission sources. The in-flight wireless access system sufficiently reduces interference between wireless zones by using high directivity antennas as described above.

In the arrangements shown in FIG. 5A and FIG. 5B, the antenna power and equivalently isotropic radiation power (EIRP) inside the cabin are at most approximately 10 mW/MHz. Furthermore, the metal panels used in the aircraft body have a strong electromagnetic shield effect, and leakage of electromagnetic waves from inside the aircraft is minute. Furthermore, when the aircraft is cruising at cruising altitude, the aircraft is, for example, approximately 10,000 meters from any ground station and is sufficiently separated from earth exploration satellites in orbit at an altitude of approximately 700 km. As a result, there is no interference with weather radar and earth exploration satellite services.

When the aircraft is in first altitude zone H1W such as when it is parked, just after take-off, and just before landing, the first frequency band limited to the F1 frequency band is used because of the proximity to the ground system. On the ground the F1 frequency band is a frequency band reserved for wireless access systems and can be used freely indoors without enabling DFS and TPC. The first services requiring minimal bandwidth can therefore be reliably provided without lowering the transmission capacity and without enabling DFS and TPC. When the aircraft altitude is sufficiently high and is in the second altitude zone H2W, the aircraft is sufficiently separated from the ground system, and the second frequency band comprising frequency bands F1, F2, and F4 is used. Because interference with weather radar and earth exploration satellites does not occur in the second altitude zone H2W, the second services including VOD services can be provided without enabling DFS and TPC by using the full bandwidth available in the second frequency band. While DFS and TPC are preferably not used in the second altitude zone H2W in this embodiment of the invention, DFS and TPC could be used.

FIG. 5A shows the frequency band allocation in the first altitude zone H1W, and assigns wireless channel C36 in the F1 frequency band throughout the aircraft for first services use. Wireless channel C36 is suited for use with the first services because the first services must be provided throughout the aircraft and wireless channel C36 covers the entire aircraft.

In the second altitude zone H2W, the wireless channels available on frequency bands F1, F2, and F4 are allocated to the second services in addition to wireless channel D36 covering the entire aircraft. These wireless channels are set so that the spatial distribution shown in FIG. 5B has no correlation to the frequency distribution shown in FIG. 4. More specifically, the wireless channels are allocated so that there is no correlation between the wireless channels allocated to any two adjacent wireless zones shown in FIG. 5B and the frequency distributions shown in FIG. 4. More specifically, the wireless channels are assigned to the wireless zones so that except within the F2 and F4 frequency bands neighboring frequency bands in FIG. 4 are not assigned to the wireless channels for any two adjacent wireless zones shown in FIG. 5B. In this first embodiment of the invention the center frequency distance between wireless channel C36 and wireless channel C44 is the interval of one wireless channel and is the closest frequency distance assigned to any two wireless zones. All other wireless zones have a frequency distance of two wireless channels or more. The wireless zone and wireless channel allocation is changed according to whether the aircraft is in the first altitude zone or second altitude zone.

An airplane normally rises at a simple rate after take-off and then starts cruising at a predetermined cruising altitude. When landing, the airplane descends at a simple rate from the predetermined cruising altitude and then lands. Depending on the congestion at the airport, however, the airplane may temporarily descend after take-off and may temporarily ascend when landing as instructed by the air traffic controller. Chattering occurs at such times when the wireless channel allocation is automatically changed as a result of determining whether the aircraft is in the first altitude zone H1W or second altitude zone H2W.

To prevent such chattering, the maximum altitude H1 in first altitude zone H1W is higher than the minimum altitude H2 in second altitude zone H2W, and a hysteresis characteristic is given to the range to the boundary altitude H1 at which the aircraft moves from the first altitude zone H1W into the second altitude zone H2W, and the boundary altitude H1 at which the aircraft moves from the second altitude zone H2W into the first altitude zone H1W. More particularly, when the aircraft is ascending, the aircraft enters the second altitude zone H2W when the aircraft goes above the maximum altitude H1 of the first altitude zone H1W. Because the minimum altitude H2 of the second altitude zone H2W is lower than the maximum altitude H1 of the first altitude zone H1W, a slight descent does not result in chattering. Furthermore, when the aircraft descends, the aircraft enters the first altitude zone H1W when the aircraft passes below the minimum altitude H2 of the second altitude zone H2W. Because the maximum altitude H1 of the first altitude zone H1W is higher than the minimum altitude H2 of the second altitude zone H2W, a slight ascent does not result in chattering. In other words, when the aircraft leaves the first altitude zone, the aircraft is in the second altitude zone and the wireless access system is set to the second frequency band, and when the aircraft leaves the second altitude zone, the aircraft is in the first altitude zone and the wireless access system is set to the first frequency band.

Some airports around the world are at high elevations, such as Mexico City airport at an altitude of 2240 meters and Denver Airport at an altitude of 1660 meters. When landing and departing from such airports the aircraft may enter the second frequency band shortly after takeoff and remain in the second frequency band until just before landing depending on the altitude settings. To prevent this from happening, a surface elevation detection signal denoting the altitude of the Earth's surface at the current flight position of the aircraft is detected. The surface altitude H3 of the airport 22 represents the elevation of the airport 22. The upper and lower limits of the first and second altitude zones are set based on the surface elevation detection signal. For example, the minimum altitude H2 of the second altitude zone H2W could be set so that H2 is less than the maximum altitude H1 of the first altitude zone H1W and is approximately half the sum of the cruising altitude H4 plus the altitude indicated by the surface elevation detection signal.

The present invention is described in further detail below based on the arrangement of this first embodiment of the invention as shown in FIG. 1. Referring to FIG. 1, the aircraft altitude detection unit 5 sends the aircraft altitude detection signal through the auxiliary switch unit 8 to the system control unit 2. The surface elevation detection unit 6 sends the surface elevation detection signal through the auxiliary switch unit 8 to the system control unit 2. Based on the surface elevation detection signal, the system control unit 2 sets the first altitude zone H1W and the second altitude zone H2W.

FIG. 8 is a flow chart of processes executed by the system control unit 2 to control system operation, specifically the process executed by the altitude zone identification unit 23 to determine the altitude zone, and the process executed by the selection unit 24 to select the frequency band.

The process run by the altitude zone identification unit 23 starts in step S1. In step S2 the previous altitude zone, that is, the altitude zone that was previously identified, is read from the predetermined address in memory where the previous altitude zone is written to the system control unit 2. Whether the previous altitude zone that was read from memory is the first altitude zone is then determined in step S3.

If step S3 returns Yes, the previous altitude zone was the first altitude zone and control goes to step S4. If step S3 returns No, the previous altitude zone was the second altitude zone and control goes to step S5.

Whether the aircraft altitude detection signal denotes the first altitude zone is determined in step S4. If step S4 returns Yes, the aircraft altitude detection signal is in the first altitude zone and control goes to step S6. If step S4 returns No, the aircraft altitude detection signal is not in the first altitude zone and control goes to step S7.

Whether the aircraft altitude detection signal denotes the second altitude zone is determined in step S5. If step S5 returns Yes, the aircraft altitude detection signal is in the second altitude zone and control goes to step S7. If step S5 returns No, the aircraft altitude detection signal is not in the second altitude zone and control goes to step S6.

In step S6 the current altitude zone is identified as the first altitude zone, the first altitude zone is written to a predetermined address in memory, and control goes to step S8.

In step S7 the current altitude zone is identified as the second altitude zone, the second altitude zone is written to a predetermined address in memory, and control goes to step S9.

This completes the process run by the altitude zone identification unit 23.

The process run by the selection unit 24 starts next. In step S8 the frequency band is set to the first frequency band and control goes to step S10.

In step S9, the frequency band is set to the second frequency band and control then goes to step S10.

In step S10, a selection signal denoting the selected frequency band is output to all access points.

Processing by the selection unit 24 ends in step S11.

Step S1 executed by the altitude zone identification unit 23 is executed at a predetermined interval, such as once every minute, and the process executed by the selection unit 24 is executed after the process run by the altitude zone identification unit 23 ends. This arrangement enables imparting a hysteresis characteristic to the altitude zone identification unit 23 when some altitudes are in both the first altitude zone H1W and second altitude zone H2W.

An embodiment of the altitude zone identification unit 23 that differs from the flow chart shown in FIG. 8 is described next. In this arrangement the first altitude zone H1W and second altitude zone H2W are set so that they do not overlap. The system control unit 2 determines whether the aircraft altitude detection signal denotes an altitude in the first altitude zone or second altitude zone. If the aircraft altitude detection signal is in the first altitude zone, the current altitude zone is the first altitude zone and the first frequency band is selected. If the aircraft altitude detection signal is in the second altitude zone, the current altitude zone is the second altitude zone and the second frequency band is selected.

The system control unit 2 then sends a selection signal denoting the selected frequency band to all access points. This process is run at a predetermined interval, but this interval is longer than the interval at which the process shown in FIG. 8 is run. If this process begins every 2 minutes, for example, the altitude zone can be appropriately detected without causing chattering.

If the first altitude zone H1W and second altitude zone H2W are thus set to not overlap and the interval at which this process runs is a short predetermined interval similar to that of FIG. 8, the likelihood of chattering occurring can be sufficiently reduced by setting the boundary between the first altitude zone H1W and second altitude zone H2W at a relatively high altitude, such as approximately 80% of the cruising altitude.

Arrangements for preventing chattering will obviously not be limited to these examples and one with ordinary skill in the related art will be able to easily modify these arrangements using the technology of this invention.

The system control unit 2 comprises one or more computers as described above, and normally executes the process of the altitude zone identification unit 23 and the process of the selection unit 24 in software. A process run by a crew member is described as an example of another possible embodiment.

In this arrangement a selection switch and an altitude zone display gauge for displaying the altitude denoted by the aircraft altitude detection signal are disposed to the system control unit 2. The crew member then uses the altitude zone identification unit 23 to identify the altitude zone based on the altitude zone display gauge. Using the selection unit 24, the crew member then sets the selection switch based on the identified altitude zone. The selection switch then sends a selection signal denoting the first frequency band or second frequency band as the current frequency band to all access points.

The access points 11A, 11B then set the frequency band for wireless access to the first frequency band or second frequency band based on this selection signal. The system control unit 2 simultaneously sends the selection signal through the auxiliary switch unit 8 and main switch unit 7 to the server unit 1. The server unit 1 provides the first service if the selection signal denotes the first frequency band, and provides the second service if the selection signal denotes the second frequency band.

The selection signal is also sent by way of the wireless data signal 12A to the client unit 13AA. If the selection signal denotes the first frequency band, the client unit 13AA informs the passenger by the monitor unit 16AA that the first services are available and blocks the operating terminal unit 15AA from receiving the second services. If the selection signal denotes the second frequency band, the client unit 13AA informs the passenger by the monitor unit 16AA that the second services are available and enables the operating terminal unit 15AA to receive the second services.

By wirelessly transmitting data signals to each seat, this first embodiment of the invention enables changing the seating configuration without changing the wiring, and thus enables changing the seating configuration in a short time, improving the in-service rate of the aircraft, and reducing the cost of changing the seating configuration.

Furthermore, because the wireless frequency band is changed based on the altitude of the aircraft, a first frequency band that is limited to prevent interference with the ground communication system is used and the minimal essential first services are provided when the aircraft is in the relatively low first altitude zone. When the aircraft is in the relatively high second altitude zone, however, a wide second frequency band that does not interfere with the ground systems and is not disrupted by the ground systems is used to provide advanced second services such as video-on-demand services. As a result, the invention enables providing advanced services onboard the aircraft while reducing mutual wireless interference with ground systems.

Second Embodiment

This second embodiment of the invention differs from the first embodiment in the allocation of wireless channels as further described below. Other aspects of the arrangement, operation, and effect of this second embodiment are the same as the first embodiment, and further description thereof is thus omitted.

Figure 6A:
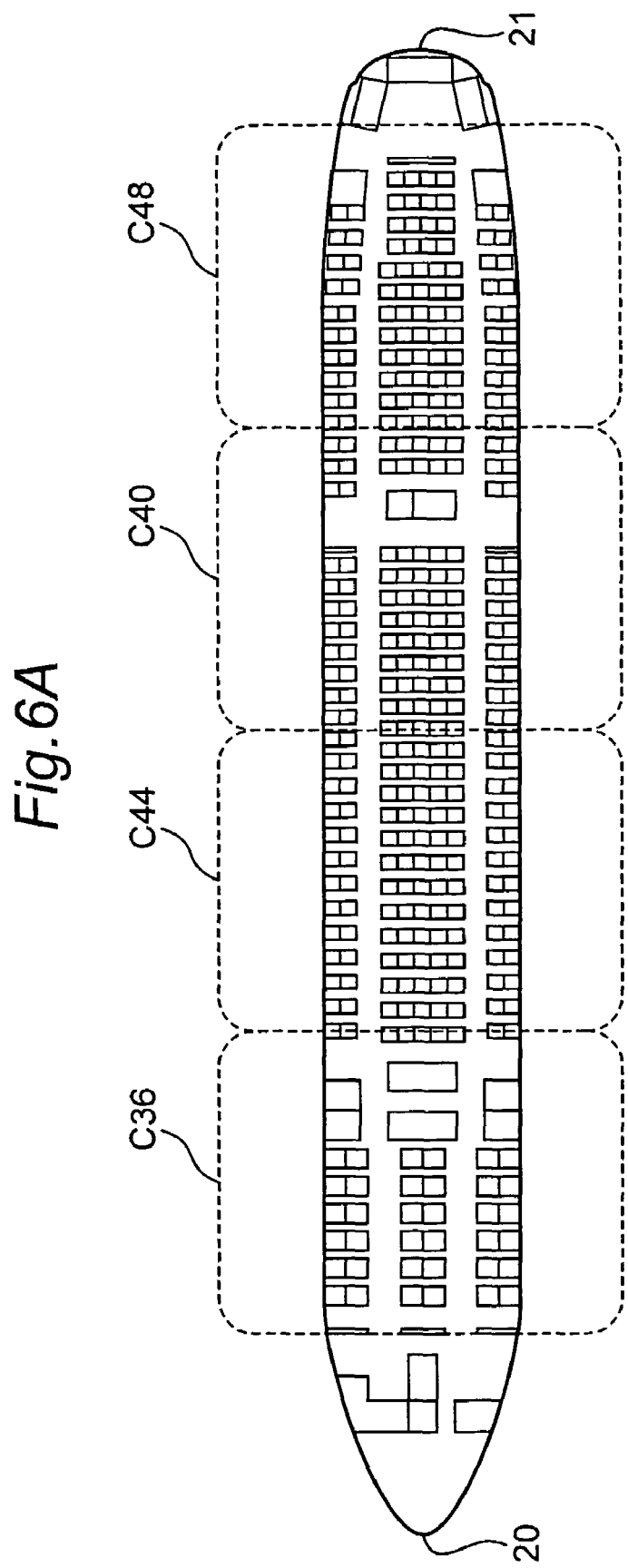
FIG. 6A describes wireless channel coverage in a second embodiment of the invention when the aircraft is at low altitude.
Figure 6B:
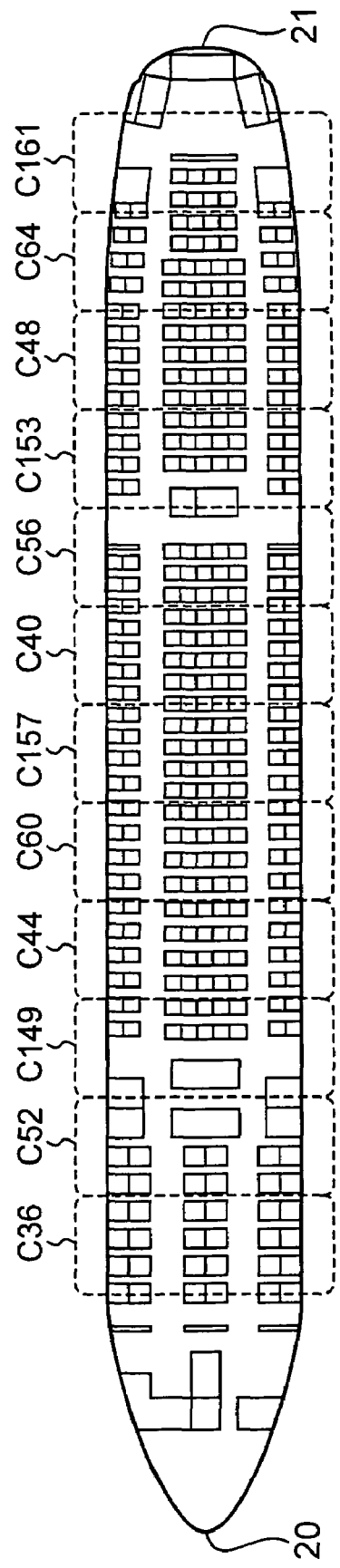
FIG. 6B describes wireless channel coverage in a second embodiment of the invention when the aircraft is at high altitude.

FIG. 6A and FIG. 6B describe different methods of allocating the wireless channels shown in FIG. 4 to different parts of the airplane. The arrangements shown in FIG. 6A and FIG. 6B differ from the arrangements shown in FIG. 5A and FIG. 5B only in that the wireless zones indicated by dotted lines and the wireless channel allocated to each wireless zone are different.

FIG. 6A shows the zone and channel allocation when in the first altitude zone, at which time the wireless channels C36, C44, C40, and C48 in the F1 frequency band are allocated for first service use. The first services must normally be delivered to all parts of the airplane, and the same content is distributed on wireless channels C36, C44, C40, and C48. In addition, if a guide to the in-flight services available after takeoff is given, the content of the guide can be changed for first class, business class, and economy class, for example.

In the second altitude zone the wireless channel allocation is as shown in FIG. 6B, and wireless channels from the F1, F2, and F4 frequency bands are allocated to the second services. The wireless channels are set so that the spatial arrangement shown in FIG. 6B does not correspond to the frequency distribution shown in FIG. 4. More specifically, the wireless channels are assigned to the wireless zones so that except within the F2 and F4 frequency bands neighboring frequency bands in FIG. 4 are not assigned to the wireless channels for any two adjacent wireless zones shown in FIG. 6B. The channel distance between the two wireless channels of any two adjacent wireless zones is at least three wireless channels in this second embodiment of the invention. The width of each wireless zone in the arrangement shown in FIG. 6B for this second embodiment of the invention is greater than the wireless zone width in the arrangement shown in FIG. 5B for the first embodiment, and the wireless channels can thus be allocated with greater freedom.

Third Embodiment

The allocation of wireless channels in this third embodiment differs from the allocation in the first and second embodiments. Other aspects of the arrangement, operation, and effect of this second embodiment are the same as the first embodiment, and further description thereof is thus omitted.

FIG. 9A and FIG. 9B describe another method of allocating the wireless channels shown in FIG. 4 to different parts of the airplane. The arrangements shown in FIG. 9A and FIG. 9B differ from the arrangements shown in FIG. 5A and FIG. 5B only in that the wireless zones indicated by dotted lines and the wireless channel allocated to each wireless zone are different.

FIG. 9A shows the zone and channel allocation when in the first altitude zone, at which time the wireless channel C36 in the F1 frequency band is allocated for first service use. Wireless channel C36 is suited for use with the first services because the first services must be provided throughout the aircraft and wireless channel C36 covers the entire aircraft. In addition, wireless channels C44 and C48 in the F1 frequency band are allocated to different parts of the airplane. If a guide to the in-flight services available after takeoff is given, the content of the guide can be changed for first class, business class, and economy class, for example.

In the second altitude zone the wireless channel allocation is as shown in FIG. 9B, and wireless channels from the F1, F2, and F4 frequency bands are allocated to the second services. The wireless channels are set so that the spatial arrangement shown in FIG. 9B does not correspond to the frequency distribution shown in FIG. 4. More specifically, the wireless channels are assigned to the wireless zones so that except within the F2 and F4 frequency bands neighboring frequency bands in FIG. 4 are not assigned to the wireless channels for any two adjacent wireless zones shown in FIG. 9B. The channel distance between the two wireless channels of any two adjacent wireless zones is at least three wireless channels in this third embodiment of the invention. The width of each wireless zone in the arrangement shown in FIG. 9B for this third embodiment of the invention is greater than the wireless zone width in the arrangement shown in FIG. 5B for the first embodiment, and the wireless channels can thus be allocated with greater freedom.

Fourth Embodiment

The allocation of wireless channels in this fourth embodiment differs from the allocation in the first, second, and third embodiments. Other aspects of the arrangement, operation, and effect of this second embodiment are the same as the first embodiment, and further description thereof is thus omitted.

Figure 10:
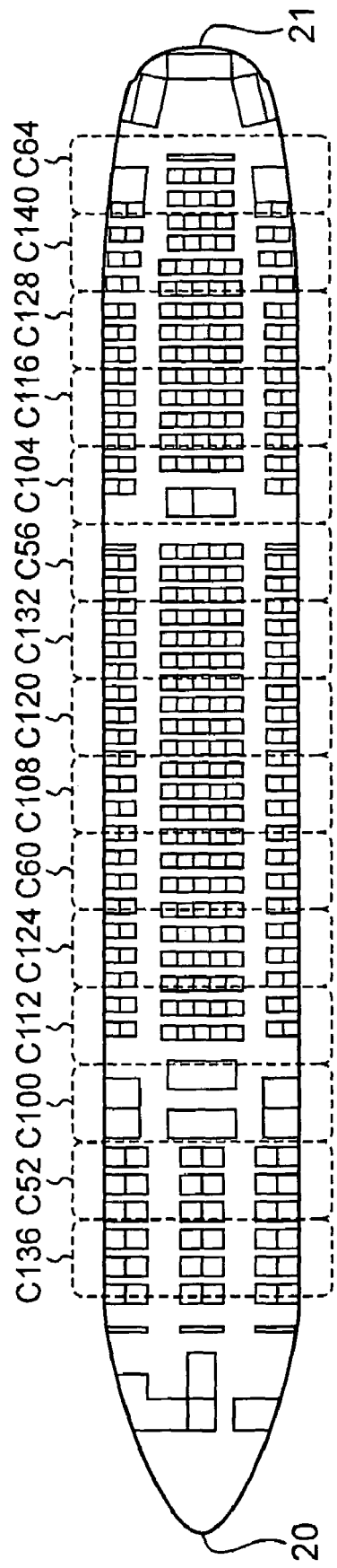
FIG. 10 describes wireless channel coverage in a fourth embodiment of the invention when the aircraft is at high altitude.

FIG. 10 describes another method of allocating the wireless channels shown in FIG. 4 to different parts of the airplane. The arrangement shown in FIG. 10 differs from the arrangements shown in FIG. 5A and FIG. 5B only in that the wireless zones indicated by dotted lines and the wireless channel allocated to each wireless zone are different. Channel allocation in the first altitude zone is the same as in the third embodiment shown in FIG. 9A, and further description thereof is omitted.

The wireless channels are reallocated as shown in FIG. 10 in the second altitude zone, and the wireless channels on the F2 and F3 frequency bands are allocated to the second service. The wireless channels are set so that the spatial arrangement shown in FIG. 10 does not correspond to the frequency distribution shown in FIG. 4. More specifically, the wireless channels are assigned to the wireless zones so that neighboring frequency bands in FIG. 4 are not assigned to the wireless channels for any two adjacent wireless zones shown in FIG. 10. The channel distance between the two wireless channels of any two adjacent wireless zones is at least two wireless channels in this fourth embodiment of the invention. Because the channel allocation of this fourth embodiment of the invention shown in FIG. 10 uses the F3 frequency band, which has more channels than the arrangement shown in FIG. 5B for the first embodiment, more channels are available for allocation to the wireless zones.

Preferred embodiments of the present invention are described above, but the invention is not limited to these embodiments and can be varied in many ways by one with ordinary skill in the related art using the technology of this invention.

The present invention can be used in a wireless transmission system and method.

What is claimed is:

1. A wireless transmission system for wirelessly transmitting data signals in a flight vehicle, comprising:
   a wireless transmission arrangement operable to wirelessly transmit the data signals on any one frequency band selected from among M (where M is an integer of 2 or more) frequency bands;
   a wireless reception arrangement operable to receive the data signals;
   an altitude zone identification arrangement operable to determine in which of N (where N is an integer of 2 or more) altitude zones the flight vehicle is flying; and
   a selection arrangement operable to select one frequency band from the M frequency bands based on the altitude zone identified by the altitude zone identification arrangement.

2. The wireless transmission system described in claim 1, wherein the N altitude zones are a first altitude zone and a second altitude zone, and
   the M frequency bands are a first frequency band and a second frequency band.

3. The wireless transmission system described in claim 2, wherein the average altitude of the first altitude zone is lower than the average altitude of the second altitude zone.

4. The wireless transmission system described in claim 2, wherein the second frequency band is wider than the first frequency band.

5. The wireless transmission system described in claim 2, wherein the wireless transmission arrangement is set to the first frequency band when the flight vehicle is in the first altitude zone, and the wireless transmission arrangement is set to the second frequency band when the flight vehicle is in the second altitude zone.

6. The wireless transmission system described in claim 5, wherein there is hysteresis characteristic between where the flight vehicle moves from the first altitude zone into the second altitude zone and where the flight vehicle moves from the second altitude zone into the first altitude zone.

7. The wireless transmission system described in claim 2, wherein the maximum altitude of the first altitude zone is greater than the minimum altitude of the second altitude zone.

8. The wireless transmission system described in claim 2, wherein at least part of the first frequency band is contained in the second frequency band.

9. The wireless transmission system described in claim 2, wherein one or both of dynamic frequency selection and transmission power control are applied in at least a part of the second frequency band.

10. The wireless transmission system described in claim 2, wherein at least a part of the first frequency band is in the 5.15 GHz to 5.25 GHz frequency band.

11. The wireless transmission system described in claim 1, wherein the altitude zone identification arrangement comprises a flight vehicle altitude detection arrangement operable to detect the altitude of the flight vehicle.

12. The wireless transmission system described in claim 1, wherein the N altitude zones vary based on the altitude of the Earth's surface at the flight position of the flight vehicle.

13. The wireless transmission system described in claim 1, further comprising:
   a server unit for storing and transmitting data signals;
   a transmission trunk for carrying the data signals transmitted by the server unit by wire to the wireless transmission arrangement; and
   a monitor unit for displaying the data signals received by the wireless reception arrangement.

14. The wireless transmission system described in claim 1, wherein the flight vehicle is an airplane, a helicopter, a hovercraft, a floating object tethered to the ground, a rocket, a man-made satellite, or a space station.

15. The wireless transmission system described in claim 11, wherein the flight vehicle altitude detection arrangement includes at least one of an altimeter, a GPS receiver, a barometer, a speedometer, and a wireless carrier sensor.

16. A wireless transmission method for wirelessly transmitting data signals in a flight vehicle, comprising:
   wirelessly transmitting, with a wireless transmission arrangement, the data signals on any one frequency band selected from among M (where M is an integer of 2 or more) frequency bands;
   receiving, with a wireless reception arrangement, the data signals;
   determining, by an altitude zone identification arrangement, in which of N (where N is an integer of 2 or more) altitude zones the flight vehicle is flying; and
   selecting, by a selection arrangement, one frequency band from the M frequency bands based on the altitude zone identified by the altitude zone identification arrangement.

* * * * *

UNITED STATES PATENT AND TRADEMARK OFFICE
CERTIFICATE OF CORRECTION

PATENT NO.        : 7,620,364 B2                                Page 1 of 1
APPLICATION NO.   : 11/389236
DATED             : November 17, 2009
INVENTOR(S)       : Higashida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-sixth Day of October, 2010

David J. Kappos
*Director of the United States Patent and Trademark Office*